(12) United States Patent
Athad

(10) Patent No.: US 10,493,539 B2
(45) Date of Patent: Dec. 3, 2019

(54) TOOL BODY HAVING AN INNER INSERT RECEIVING POCKET WITH RESILIENT CLAMPING MEMBER, CUTTING TOOL AND CHAMFERING CUTTING INSERT THEREFOR

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 108 days.

(21) Appl. No.: 15/434,384

(22) Filed: Feb. 16, 2017

(65) Prior Publication Data

US 2018/0229315 A1   Aug. 16, 2018

(51) Int. Cl.
*B23C 5/00* (2006.01)
*B23B 29/04* (2006.01)
(Continued)

(52) U.S. Cl.
CPC .............. *B23C 5/08* (2013.01); *B23C 5/207* (2013.01); *B23C 2210/161* (2013.01); *B23C 2220/16* (2013.01)

(58) Field of Classification Search
CPC ... B23B 27/1611; B23B 27/16; B23B 27/164; B23B 27/04; B23B 27/065; B23B 27/086; B23B 2200/048; B23B 2205/02; B23B 2205/12; B23B 29/06; B23B 29/248; B23B 29/514; B23B 5/14; Y10T 407/193; Y10T 407/1932; Y10T 407/194
See application file for complete search history.

(56) References Cited

U.S. PATENT DOCUMENTS

| | | | | |
|---|---|---|---|---|
| 1,935,069 A | * | 11/1933 | Walker | ...................... B23C 5/24 407/38 |
| 4,492,140 A | * | 1/1985 | Pano | ...................... B23D 61/06 407/46 |

(Continued)

FOREIGN PATENT DOCUMENTS

| DE | 3911995 A1 | 10/1990 |
|---|---|---|
| EP | 0610978 A1 | 8/1994 |

(Continued)

OTHER PUBLICATIONS

International Search Report dated Jun. 7, 2018, issued in PCT counterpart application (No. PCT/IL2018/050076).

(Continued)

*Primary Examiner* — Nicole N Ramos
(74) *Attorney, Agent, or Firm* — Womble Bond Dickinson (US) LLP

(57) ABSTRACT

A cutting tool includes a tool body having a peripherally disposed outer insert receiving pocket and an interiorly disposed inner insert receiving pocket with a cutting insert resiliently clamped therein. The tool body includes a through recess at least partially circumferentially bounded by a recess circumferential surface. A resilient clamping member extends into the through recess. The inner insert receiving pocket is formed by the resilient clamping member and a recess pocket portion of the recess circumferential surface. A chamfering cutting insert may be retained by the resilient clamping member, without the use of an additional, separate clamping device.

27 Claims, 4 Drawing Sheets

(51) Int. Cl.
*B23C 5/08* (2006.01)
*B23C 5/20* (2006.01)

(56) References Cited

U.S. PATENT DOCUMENTS

| | | | |
|---|---|---|---|
| 4,558,974 | A | 12/1985 | Pano |
| 4,604,004 | A * | 8/1986 | Armbrust ............. B23B 27/045 407/110 |
| 4,844,668 | A | 7/1989 | Pettersson |
| 4,844,670 | A | 7/1989 | Heule |
| D330,381 | S | 10/1992 | Gustafsson et al. |
| 5,346,335 | A | 9/1994 | Harpaz et al. |
| 5,360,298 | A | 11/1994 | Hedlund |
| 5,803,675 | A | 9/1998 | Von Haas |
| 6,273,651 | B1 | 8/2001 | Heinloth et al. |
| 9,162,296 | B2 | 10/2015 | Athad |
| 2002/0176754 | A1 * | 11/2002 | Barazani ................. B23B 27/04 407/42 |
| 2004/0105732 | A1 | 6/2004 | Wetli |

FOREIGN PATENT DOCUMENTS

| | | | |
|---|---|---|---|
| JP | H11320217 A | 11/1999 | |
| JP | 2011020235 A * | 2/2011 | |
| WO | WO 99/28073 | 6/1999 | |
| WO | WO-2005077578 A2 * | 8/2005 | ............. B23B 27/04 |
| WO | WO 2008/140191 | 11/2008 | |
| WO | WO 2008/140191 A1 | 11/2008 | |
| WO | WO-2009151168 A1 * | 12/2009 | ............. B23C 5/08 |
| WO | WO 2011/136275 A1 | 11/2011 | |

OTHER PUBLICATIONS

Written Opinion dated Jun. 7, 2018, issued in PCT counterpart application (No. PCT/IL2018/050076).

* cited by examiner

TOOL BODY HAVING AN INNER INSERT RECEIVING POCKET WITH RESILIENT CLAMPING MEMBER, CUTTING TOOL AND CHAMFERING CUTTING INSERT THEREFOR

FIELD OF THE INVENTION

The subject matter of the present application relates to cutting tools having a tool body with an outer insert receiving pocket and an inner insert receiving pocket, for releasably retaining a chamfering cutting insert therein, in general, and to such tool bodies with a resilient clamping member for resiliently clamping the chamfering cutting insert, in particular.

BACKGROUND OF THE INVENTION

Cutting tools can have a tool body that can be provided with an outer insert receiving pocket for retaining a grooving/parting insert therein and an inner insert receiving pocket for releasably retaining a chamfering cutting insert therein by a clamping member. Examples of such cutting tools are disclosed in, for example, U.S. Pat. No. 9,162,296 and WO 1999/028073, where the clamping member is a retaining screw.

Other cutting tools can be provided with a cutting insert that performs a dual cutting role. Such a cutting insert is provided with a parting section to part the workpiece and a chamfering section to chamfer the workpiece after the parting process is compete. An example of such cutting insert is disclosed in, for example, WO 2008/140191.

SUMMARY OF THE INVENTION

In accordance with a first aspect of the subject matter of the present application there is provided a tool body comprising:
  two opposing body side surfaces and a body peripheral surface extending therebetween;
  a peripherally disposed outer insert receiving pocket; and
  an interiorly disposed inner insert receiving pocket comprising a resilient clamping member configured to resiliently retain a chamfering cutting insert therein without the use of an additional, separate clamping device.

In accordance with a second aspect of the subject matter of the present application there is provided a non-indexable chamfering cutting insert, having an insert longitudinal axis defining a forward to rearward direction, the cutting insert comprising:
  opposing insert front and rear end surfaces and an insert peripheral surface extending therebetween, the insert peripheral surface comprising an insert top surface;
  a non-cutting edge formed by the intersection of the insert front end surface and the insert top surface; and
  at least one laterally protruding chamfering portion comprising a chamfering cutting edge; wherein:
  in a top view of the insert, the non-cutting edge extends on both sides of a vertical plane containing the insert longitudinal axis and passing through the insert top surface; and
  the insert top surface comprises an insert top raised portion comprising an insert top abutment surface and an insert top lowered portion comprising an insert top non-abutment surface, the insert top lowered portion extending from the insert rear end surface towards the insert top raised portion.

In accordance with a third aspect of the subject matter of the present application there is provided a cutting tool comprising:
  a tool body of the sort described above; and
  a cutting insert, of the sort described above, resiliently clamped in the inner insert receiving pocket by the resilient clamping member.

In accordance with a fourth aspect of the subject matter of the present application there is provided a non-indexable chamfering cutting insert, having an insert longitudinal axis defining a forward to rearward direction, the cutting insert comprising:
  opposing insert front and rear end surfaces and an insert peripheral surface extending therebetween, the insert peripheral surface comprising an insert top surface;
  a vertical plane containing the insert longitudinal axis and passing through the insert top surface;
  a non-cutting edge formed by the intersection of the insert front end surface and the insert top surface; and
  at least one laterally protruding chamfering portions comprising a chamfering cutting edge; wherein:
  each chamfering portion is located at a forward end of the cutting insert;
  in a top view of the insert, the non-cutting edge extends on both sides of the vertical plane containing the insert longitudinal axis; and
  in said top view of the insert, the insert's total length taken along the insert longitudinal axis is larger than the insert's total width taken perpendicular to the vertical plane.

It is understood that the above-said is a summary, and that features described hereinafter may be applicable in any combination to the subject matter of the present application, for example, any of the following features may be applicable to the tool body and/or cutting insert and/or cutting tool:

The resilient clamping member can be disposed between the inner insert receiving pocket and a resilience slit.

The resilient clamping member can be a cantilever having a clamping member fixed end and a clamping member free end.

The inner insert receiving pocket can extend along a pocket longitudinal axis which passes through a pocket opening end and a pocket distal end, the pocket opening end being located closer to the body peripheral surface than the pocket distal end. The inner insert receiving pocket can transitions into an insert insertion clearance region at the pocket opening end. The insert insertion clearance region can have a larger dimension, as measured in a direction perpendicular to the pocket longitudinal axis, than the inner insert receiving pocket.

The tool body can comprise a through recess opening out to the two body side surfaces, and at least partially circumferentially bounded by a recess circumferential surface. The resilient clamping member can extend into the through recess. The interiorly disposed inner insert receiving pocket can be formed by the resilient clamping member and a recess pocket portion of the recess circumferential surface.

The resilient clamping member can be connected to the recess circumferential surface.

The through recess can be spaced apart from the body peripheral surface.

The through recess can open out to the body peripheral surface.

The tool body can have a body central axis that intersects the two body side surfaces. The two body side surfaces can be planar and perpendicular to the body central axis.

The tool body can be disc-like and have a body central axis that intersects the two body side surfaces. The tool body can be rotatable about the body central axis in a rotational direction. The inner insert receiving pocket is closer to the body central axis than is the outer insert receiving pocket.

The tool body can be a cutting blade and have a body central axis that intersects the two body side surfaces. The tool body can be mirror symmetric about a transverse plane containing the body central axis. The inner insert receiving pocket is closer to the both the transverse plane and body central axis, than is the outer insert receiving pocket.

The cutting insert can comprise exactly two chamfering portions that oppose each other, each chamfering portion having a chamfering cutting edge.

The two chamfering cutting edges can be spaced apart by the non-cutting edge formed by the intersection of the insert front end surface and the insert top surface and extend rearwardly of the non-cutting edge.

The insert top raised portion can extend from the insert front end surface.

The insert top raised portion and the insert top lowered portion can be connected by an insert top intermediate surface that can be oriented transversely to the insert raised and insert top lowered portions.

The insert top abutment surface can extend to the insert top intermediate surface.

The insert top abutment surface can be generally V-shaped in an axially perpendicular cross-section.

Each chamfering portions can be located at a forward end of the cutting insert.

The insert top non-abutment surface can be planar.

The insert top raised portion has an insert top raised portion length. The insert top lowered portion has an insert top lowered portion length. The insert top raised portion length is less than the insert top lowered portion length.

In a top view of the insert, the insert's total length taken along the insert longitudinal axis can be larger than the insert's total width taken perpendicular to the vertical plane.

The resilient clamping member can comprise a clamping abutment surface. The recess pocket portion can comprise a pocket abutment surface located opposite the clamping abutment surface. The insert peripheral surface can comprise an insert bottom surface opposite the insert top surface. The insert bottom surface can comprise an insert bottom abutment surface. The insert bottom abutment surface can abut the pocket abutment surface. The clamping abutment surface resiliently engages the insert top abutment surface.

The insert top non-abutment surface can be spaced apart from the resilient clamping member.

BRIEF DESCRIPTION OF THE FIGURES

For a better understanding of the present application and to show how the same may be carried out in practice, reference will now be made to the accompanying drawings, in which.

Figure 1:
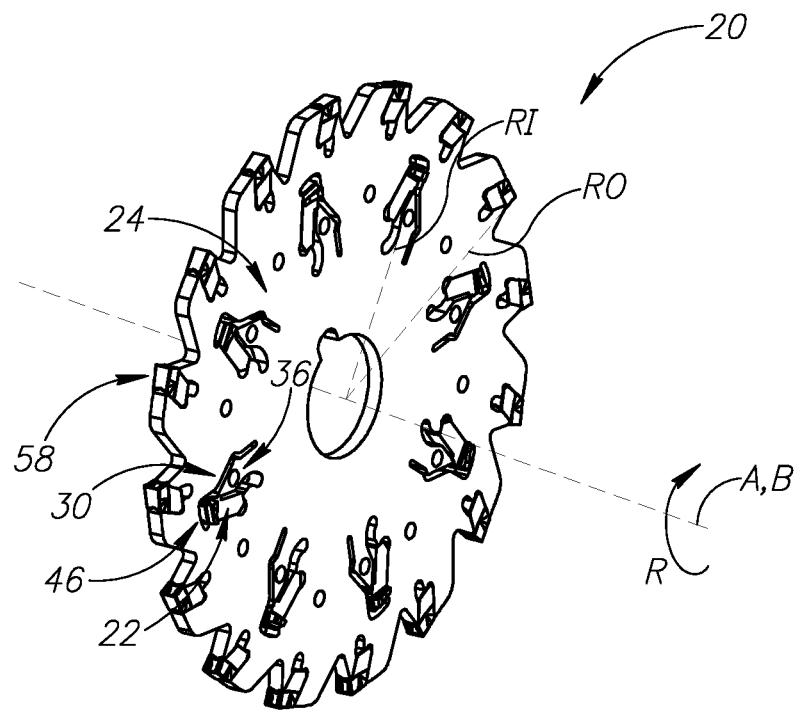
FIG. 1 is a perspective view of a cutting tool in accordance with the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1, showing a cutting tool 20, depicting an aspect of the present application, having a tool central axis A. In this non-limiting example shown in FIG. 1, the cutting tool 20 is a milling cutting tool. In particular, the milling cutting tool is a rotary slotting cutter, suitable for slotting cutting operations, and being rotatable about the tool central axis A in a rotational direction R. The cutting tool 20 may exhibit rotational symmetry about the tool central axis A. The cutting tool 20 has a cutting insert 22 which can be typically made from cemented carbide. The cutting tool 20 has a tool body 24 which can be typically made from steel.

It is noted that the term "slotting cutter" as used herein may be replaced with other terms applicable in the metal cutting field for such cutting tools, for example, "slot milling cutter", "slitting cutter", "grooving cutter", "slot mill cutter", "groove milling cutter", "side milling cutter", "disc milling cutter", and the like.

Reference is now made particularly to FIG. 1. The tool body 24 has a body central axis B that is co-incident with the tool central axis A. The tool body 24 includes two opposing body side surfaces 26 and a body peripheral surface 28 that extends therebetween. The body central axis B intersects the two body side surfaces 26. The body central axis B extends through a central portion of the body side surfaces 26. In accordance with some embodiments of the subject matter of the present application, the two opposing body side surfaces 26 can be planar and perpendicular to the body central axis B. The tool body 24 can be disc-like and the body central axis B forms an axis of rotation about which the tool body 24 is rotatable in a rotational direction R.

The tool body 24 includes an outer insert receiving pocket 58 that adjoins the body peripheral surface 28. That is to say the outer insert receiving pocket 58 is peripherally disposed and is suitable for, e.g., a grooving cutting insert, since its cutting edge would be accessible to the work-piece.

Figure 2:
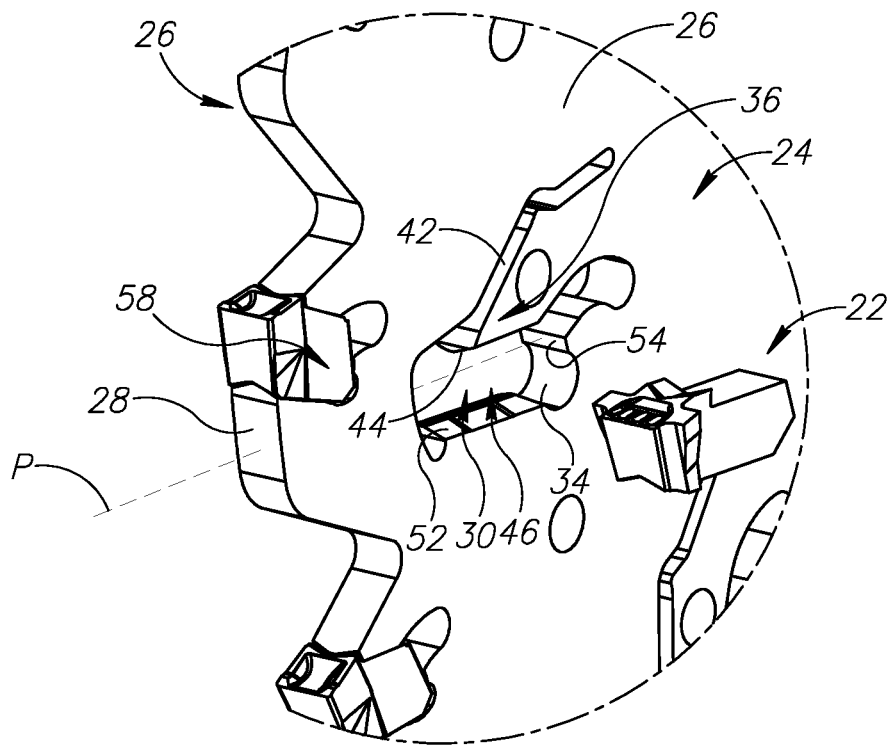
FIG. 2 is an exploded perspective view showing a through recess of the cutting tool shown in FIG. 1 in accordance with an embodiment of the present application.
Figure 3:
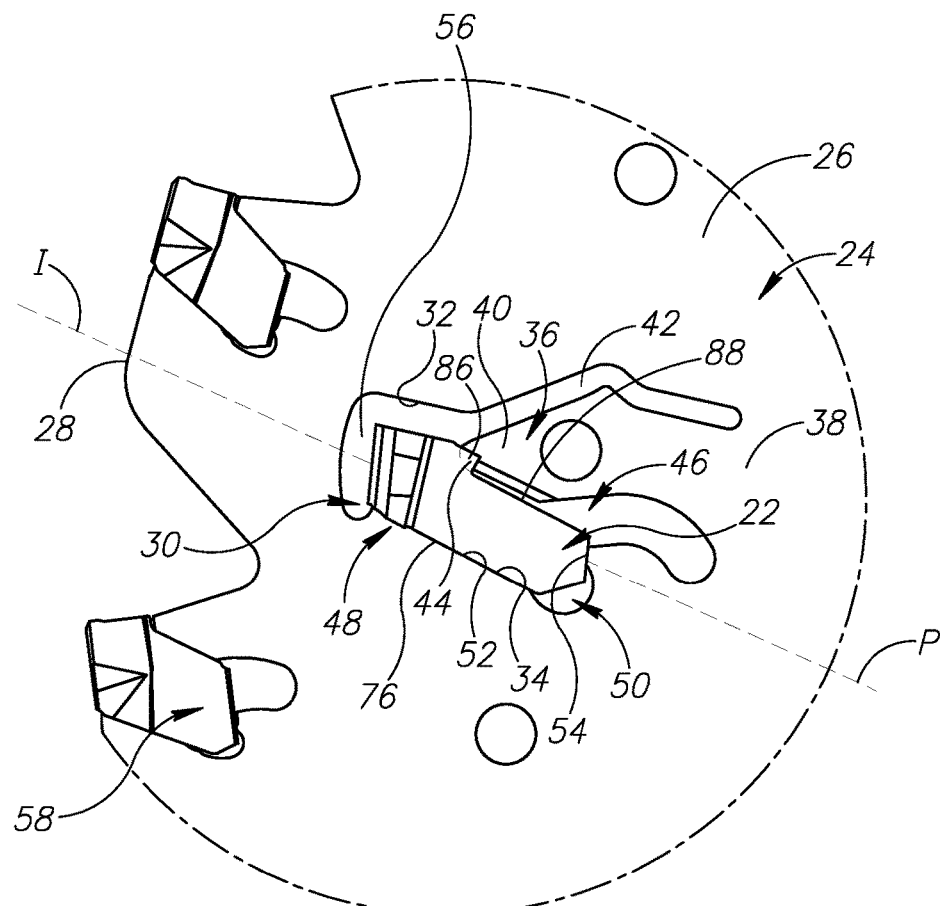
FIG. 3 is a side view of the through recess in FIG. 2.

Referring now to FIGS. 2 and 3, the tool body 24 includes a through recess 30. The through recess 30 is at least partially circumferentially bounded by a recess circumferential surface 32. The recess circumferential surface 32 extends between, and opens out to, the two body side surfaces 26. In accordance with some embodiments of the subject matter of the present application, the through recess 30 can also open out also to the body peripheral surface 28. In such a configuration, the recess circumferential surface 32 intersects the body peripheral surface 28 and only partially bounds the through recess 30. Stated differently, the through recess 30 is "open". However, in accordance with some other embodiments of the subject matter of the present application, the through recess 30 can be spaced apart from the body peripheral surface 28. In such a configuration, the recess circumferential surface 32 does not intersect the body peripheral surface 28 and fully bounds the through recess 30. Stated differently, the through recess 30 is "closed". Advantageously, the periphery of the cutting tool 20 is more rigid when the through recess 30 is closed.

Figure 4:
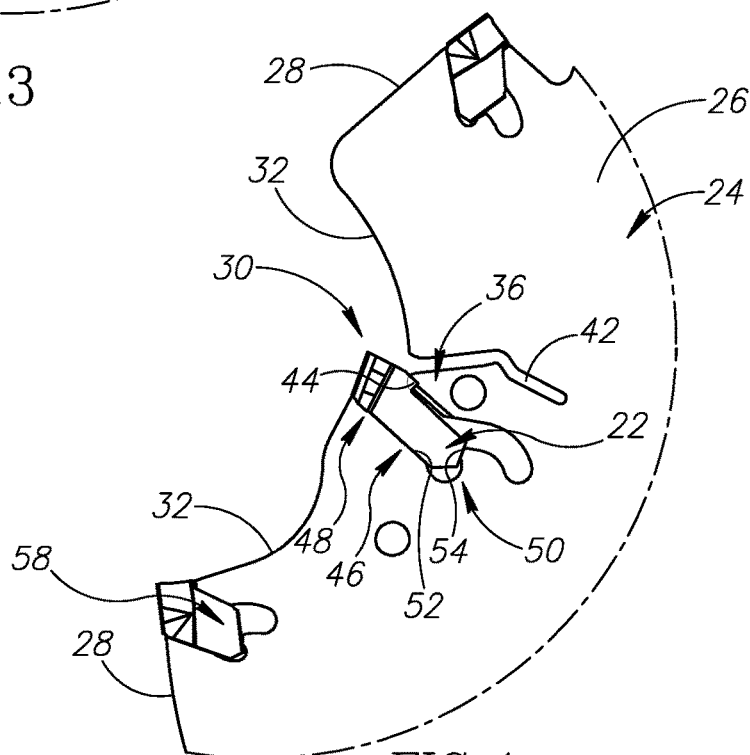
FIG. 4 is a side view of the through recess in accordance with another embodiment of the present application.

As best seen in FIGS. 3 and 4, the recess circumferential surface 32 includes a recess pocket portion 34. The tool body 24 further includes a resilient clamping member 36, which is able to be undergo elastic displacement relative to the recess pocket portion 34. The resilient clamping member 36 extends into the through recess 30. In accordance with some embodiments of the subject matter of the present application, the resilient clamping member 36 can be a cantilever having a clamping member fixed end 38 and a clamping member free end 40. Thus, the resilient clamping member 36 can be said to protrude into the through recess 30. The resilient clamping member 36 can be connected to the recess circumferential surface 32. The resilient clamping member 36 can be integrally formed with the tool body 24 to have one-piece unitary construction therewith. The resilient clamping member 36 can be bounded on one side by a resilience slit 42 to allow for elastic displacement. The resilient clamping member 36 includes a clamping abutment surface 44, for resiliently engaging a corresponding surface on the cutting insert 22.

The tool body 24 includes an inner insert receiving pocket 46, for releasably retaining a chamfering cutting insert 22 therein. Generally speaking, the inner insert receiving pocket 46 is closer to the body central axis B than is the outer insert receiving pocket 58. That is to say, the inner insert receiving pocket 46 is interiorly disposed and not suitable for, e.g., a grooving cutting insert, since its cutting edge would not be accessible to the work-piece. Such an inner insert receiving pocket 46, however, is suitable for a chamfering cutting insert (as described below), for chamfering a pre-cut groove.

The inner insert receiving pocket 46 is formed by the resilient clamping member 36 and the recess pocket portion 34. The inner insert receiving pocket 46 extends along a pocket longitudinal axis P. The inner insert receiving pocket 46 includes a pocket opening end 48 and an opposing pocket distal end 50, the pocket opening end 48 being located closer to the body peripheral surface 28 than the pocket distal end 50. The pocket longitudinal axis P passes through the pocket opening end 48 and the pocket distal end 50.

In accordance with some embodiments of the subject matter of the present application, when the through recess 30 is closed, the inner insert receiving pocket 46 can be spaced apart from the body peripheral surface 28. More precisely, as seen in FIG. 3, the inner insert receiving pocket 46 can be spaced apart from the body peripheral surface 28 by portions of the body side surface 26. In accordance with some other embodiments of the subject matter of the present application, when the through recess 30 is open, the inner insert receiving pocket 46 can be formed on the body peripheral surface 28. More precisely, as seen in FIG. 4, the through recess 30 can be formed in the recess circumferential surface 32. However, as seen in both FIGS. 3 and 4, the inner and outer insert receiving pockets 46, 58 are integrally formed together to have unitary one-piece construction.

The recess pocket portion 34 extends from the pocket opening end 48 to the clamping member fixed end 38. The recess pocket portion 34 includes a pocket abutment surface 52 that can be located opposite the clamping abutment surface 44. The pocket longitudinal axis P extends between the pocket abutment surface 52 and the clamping abutment surface 44. In accordance with some embodiments of the subject matter of the present application, the pocket abutment surface 52 and/or the clamping abutment surface 44 can be generally V-shaped, either concavely or convexly, in an axially perpendicular cross-section. The recess pocket portion 34 can include a pocket stopper surface 54, for precisely positioning the cutting insert 22 in a predetermined position and providing a restive force against the cutting forces. The pocket stopper surface 54 can be located at the pocket distal end 50.

The resilient clamping member 36 can be disposed between the inner insert receiving pocket 46 and the resilience slit 42. In accordance with some embodiments of the subject matter of the present application, the inner insert receiving pocket 46 can transition into an insert insertion clearance region 56 at the pocket opening end 48. The insert insertion clearance region 56 can be at least partially circumferentially bounded by the recess circumferential surface 32. The insert insertion clearance region 56 can have a larger dimension, as measured in a direction perpendicular to the pocket longitudinal axis P, than the inner insert receiving pocket 46. Such a configuration allows clearance for the cutting insert 22, as described later in the described.

Figure 5:
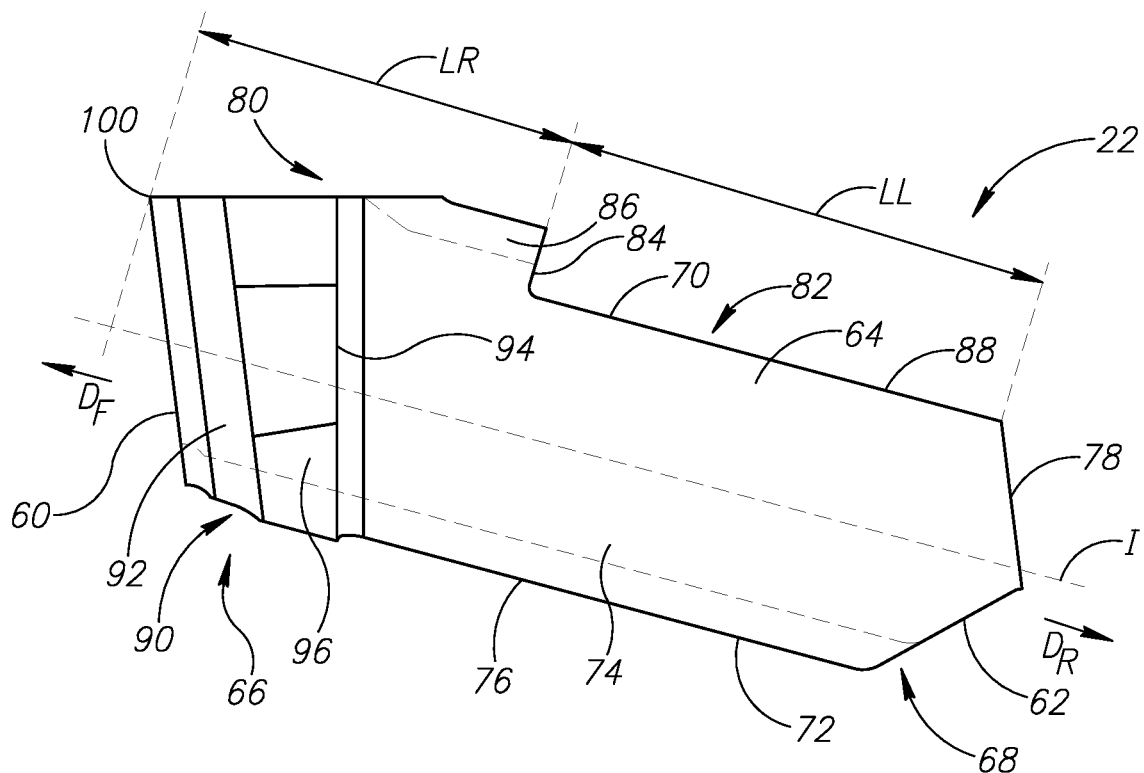
FIG. 5 is a side view of an inner cutting insert in FIG. 1.
Figure 6:
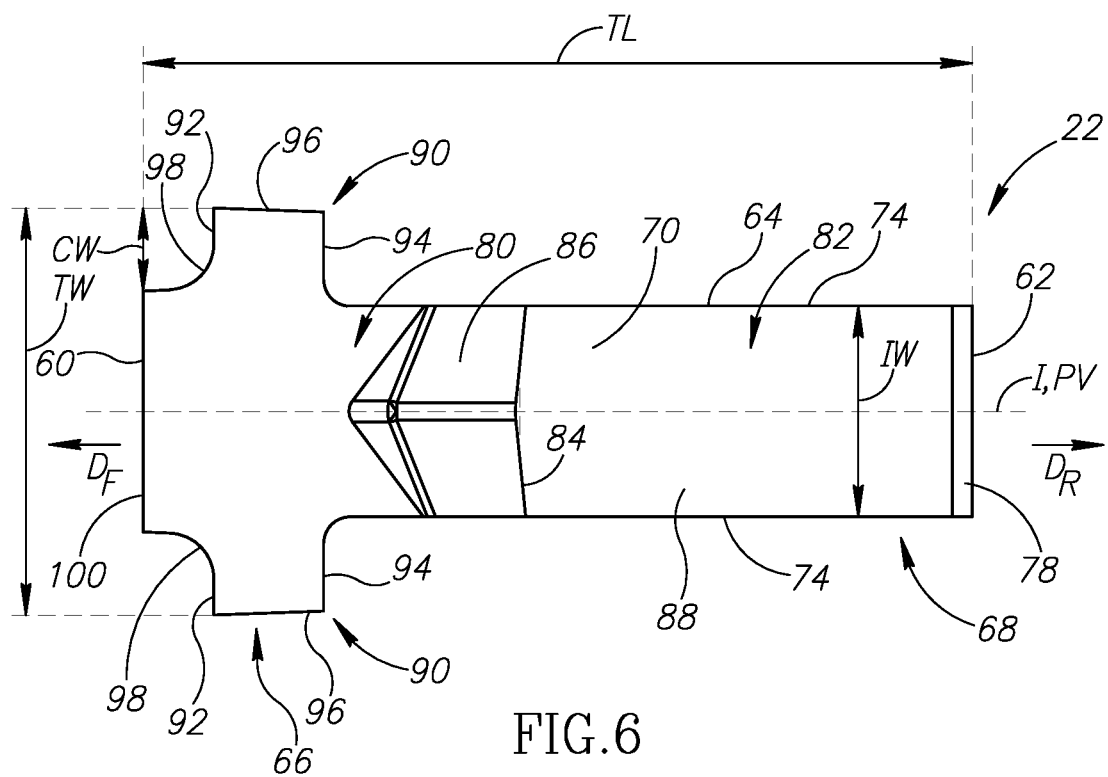
FIG. 6 is a top view of the cutting insert in FIG. 5.

Reference is now made in particular to FIGS. 5 and 6, showing the cutting insert 22, depicting another aspect of the present application. The cutting insert 22 is non-indexable and suitable for chamfering cutting operations. The cutting insert 22 is elongated, having an insert longitudinal axis I defining a forward to rearward direction $D_F$, $D_R$. The cutting insert 22 includes opposing insert front and rear end surfaces 60, 62 and an insert peripheral surface 64 that extends therebetween. The insert peripheral surface 64 extends peripherally along the insert longitudinal axis I where the insert longitudinal axis I intersects the insert front and rear end surfaces 60, 62. The insert front end surface 60 is located at a forward end 66 of the cutting insert 22 and the insert rear end surface 62 is located at the rear end 66 of the cutting insert 22. The insert peripheral surface 64 includes opposing insert top and bottom surfaces 70, 72 and two opposing insert side surfaces 74 that connect the insert top and bottom surfaces 70, 72. In accordance with some embodiments of the subject matter of the present application, the insert bottom surface 72 can include an insert bottom abutment surface 76, for abutting the pocket abutment surface 52. Similarly, the insert rear end surface 62 can include an insert stopper surface 78, for abutting the pocket stopper surface 54.

The insert top surface 70 includes an insert top raised portion 80 and an insert top lowered portion 82. The insert top lowered portion 82 is closer to the insert longitudinal axis I than the insert top raised portion 80. The insert top lowered portion 82 extends from the insert rear end surface 62 towards the insert top raised portion 80. In accordance with some embodiments of the subject matter of the present application, the insert top raised portion 80 can extend from the insert front end surface 60. The insert top raised portion 80 and the insert top lowered portion 82 can be connected by an insert top intermediate surface 84 that is oriented transversely to the insert top raised and lowered portions 80, 82.

As seen in FIG. 5, as measured in a direction of the insert longitudinal axis I, the insert top raised portion 80 has an insert top raised portion length LR. The insert top lowered portion 82 has an insert top lowered portion length LL. In accordance with some embodiments of the subject matter of the present application, the insert top raised portion length LR can be less than the insert top lowered portion length LL.

The insert top raised portion 80 includes an insert top abutment surface 86 for being resiliently clamped by the clamping abutment surface 44. In accordance with some embodiments of the subject matter of the present application, the insert top abutment surface 86 can extend to the insert top intermediate surface 84. The insert top and bottom abutment surfaces 86, 76 can have a shape that corresponds to the surface with which they respectively abut. That is to say, the insert top and bottom abutment surfaces 86, 76 can be generally V-shaped, either concavely or convexly, in an axially perpendicular cross-section.

The insert top lowered portion 82 includes an insert top non-abutment surface 88. In accordance with some embodiments of the subject matter of the present application, the insert top non-abutment surface 88 can be planar.

As seen in FIG. 6, the cutting insert 22 includes a at least one chamfering portion 90 that protrudes from the insert side surface 74. Preferably, the cutting insert 22 can include exactly two chamfering portions 90 that oppose each other. That is to say, the cutting insert 22 includes two opposing laterally protruding chamfering portions 90. Such a configuration allows the cutting insert 22 to perform chamfering on both sides of a pre-cut groove. Each chamfering portion 90 includes opposing chamfering front and rear surfaces 92, 94 and a chamfering intermediate surface 96 that extends therebetween. The chamfering front surface 92 is closer to the insert front end surface 60 than the chamfering rear surface 94. As measured in a direction perpendicular to insert longitudinal axis I, the chamfering intermediate surface 96 can be spaced apart from the insert side surface 74 by a chamfering width CW which defines the maximum width of the chamfer to be cut. Preferably, the chamfering width CW can be approximately 30% of the insert width IW of the cutting insert 22 (as measured between the insert side surface 74). Each chamfering portion 90 includes a chamfering cutting edge 98. The chamfering cutting edge 98 is formed at the intersection of the chamfering front surface 92 and the insert top surface 70. In this non-limiting example shown in the drawings, the chamfering cutting edges 98 are curved. However, the chamfering cutting edges 98 could also be straight if a straight chamfer is desired. In accordance with some embodiments of the subject matter of the present application, each chamfering portion 90 can be located at a forward end 66 of the cutting insert 22. Preferably, each chamfering portion 90 is adjacent the insert front end surface 60. In the configuration with exactly two chamfering portions 90, the two chamfering cutting edges 98 can be spaced apart by, and extend rearwardly of, a non-cutting edge 100 formed by the intersection of the insert front end surface 60 and the insert top surface 70.

As seen in the top view of FIG. 6, the non-cutting edge 100 extends on both sides of a vertical plane PV containing the insert longitudinal axis I and passing through the insert top surface 70.

As also seen in the top view of FIG. 6, the insert's total length TL taken along the insert longitudinal axis I is larger than the insert's total width TW, which is taken perpendicular to the vertical plane PV and includes the lateral extent of the chamfering portions 90.

Another aspect of the subject matter of the present application includes the cutting tool 20, having the tool body 24 and the cutting insert 24 resiliently clamped in the inner insert receiving pocket 46 by the resilient clamping member 36. When the cutting tool 20 is a slotting cutter, there can be a plurality of outer insert receiving pockets 58 with grooving cutting inserts attached therein and a plurality of inner insert receiving pockets 58 with chamfering cutting inserts attached therein. Reverting back to FIG. 1, the inner insert receiving pockets 58 are located at an inner radius RI from the body central axis B and the outer insert receiving pockets 46 are located at an outer radius RO from the body central axis B, where the inner radius RI is less than the outer radius RO.

With respect to the inner insert receiving pocket 58, the insert bottom abutment surface 76 abuts the pocket abutment surface 52. The clamping abutment surface 44 resiliently engages the insert top abutment surface 86. In accordance with some embodiments of the subject matter of the present application, the insert top non-abutment surface 88 can be spaced apart from the resilient clamping member 36. The insert stopper surface 78 can abut the pocket stopper surface 54.

Figure 7:
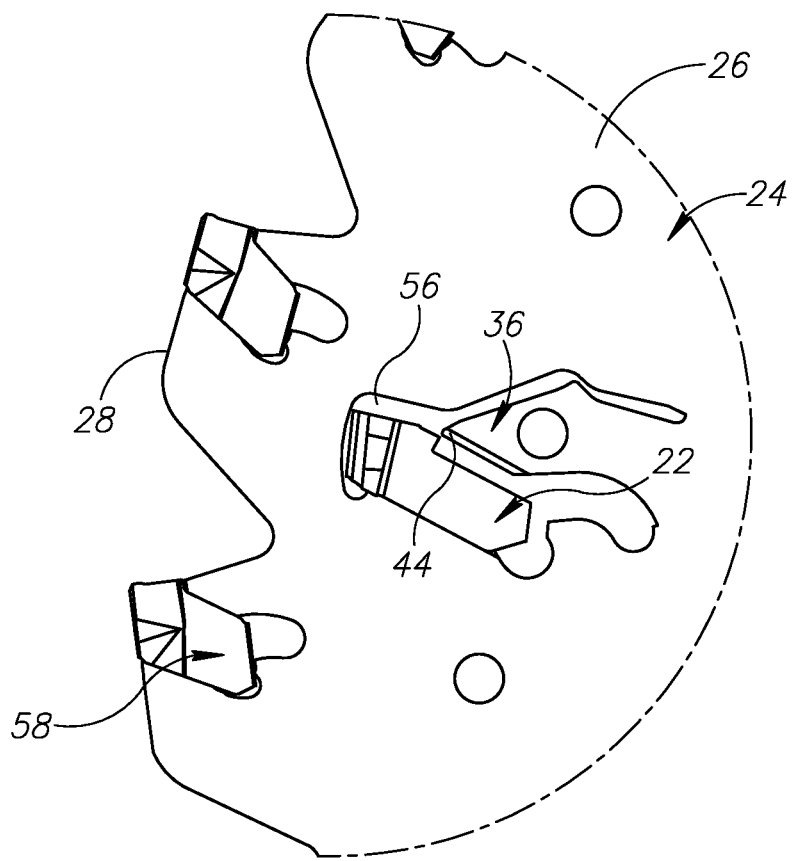
FIG. 7 is an analogous view shown in FIG. 3, when the insert receiving pocket is in an open position.

The seating and support of the cutting insert 22 in the inner insert receiving pocket 58 will be described with reference to FIGS. 3 and 7. As an introduction, it is noted that for the peripherally disposed insert pocket 58 there are at least two methods for inserting the cutting insert 22 into the outer insert receiving pocket 58. For example, one such method involves placing the cutting insert 22 in front of the outer insert receiving pocket 58 and using a key to apply a force at the forward end of the cutting insert and forcibly urge the cutting insert into the outer insert receiving pocket 58. Another method involves elastically displacing the resilient clamping member upwards to a predetermined position using a key (forming an open position of the pocket), sliding the cutting insert 22 backwards into the outer insert receiving pocket 58 and then allowing the clamping member to close and clamp the cutting insert 22. However, for interiorly disposed inner insert receiving pockets 46 where the through recess 30 is closed, the cutting insert 22 cannot be placed in front of the pocket opening end 48 since part of the tool body 24 impedes such placement of the cutting insert 22. To overcome such a problem, the insert top surface 70 of the cutting insert 22 is provided with the insert top lowered portion 82 at the rear end 68 of the cutting insert 22. Thus, it is possible to insert the cutting insert 22 laterally into a forward portion of the inner insert receiving pocket 46 before sliding the cutting insert 22 backwards into the insert pocket 58 and then allowing the clamping member to close and clamp the cutting insert 22. Preferably, the insert insertion clearance region 56 as described above is provided to form clearance for a forward portion of the cutting insert 22.

It is noted that by virtue of the resilient clamping member 36 no additional, separate clamping device, such as a clamp and/or retaining screw, is required to secure the cutting insert in the pocket. Accordingly, the inner insert receiving pocket 46 may be devoid of a threaded bore of the sort used to receive a retaining screw. Moreover, no additional width is required in the tool body 24 to accommodate said retaining screw, as shown in U.S. Pat. No. 9,162,296, for example. Thus, the tool body 24 can be made of less material and is therefore cheaper to manufacture.

It is noted that, advantageously, having peripherally and interiorly disposed pockets allows the cutting tool 20 to perform parting/grooving and chamfering cutting operations in one cutting movement.

Figure 8:
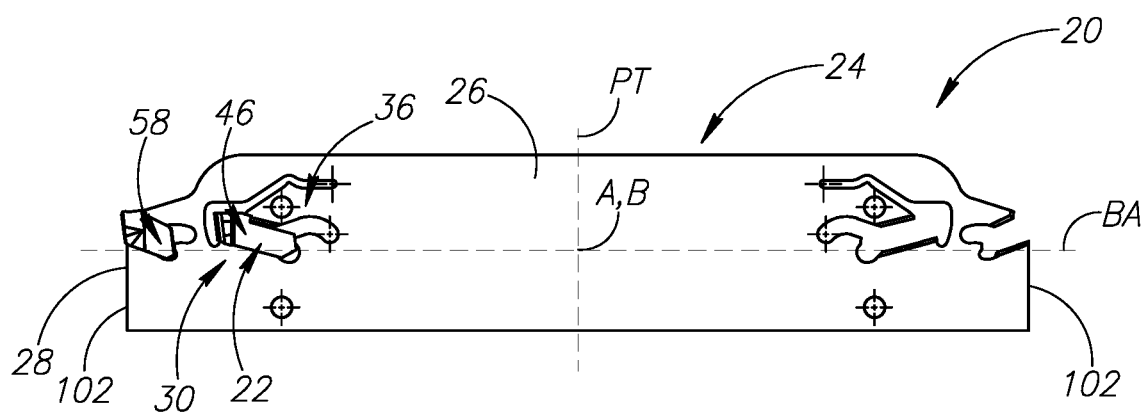
FIG. 8 is a side view of another cutting tool in accordance with the present application.

The subject matter of the present application is not restricted only to rotary slotting cutters and could also be applicable to, for example but not limited to, non-rotary turning cutting tools, where the cutting tool 20 is fixedly mounted. For example, FIG. 8 shows a tool body also in accordance with the present application. The tool body 24 of FIG. 8 is in the form of a cutting blade having two opposite blade ends 102, at least one of which is configured for cutting (i.e. has at least one inner insert receiving pocket 46 and at least one outer insert receiving pocket 58). The cutting blade can exhibit mirror symmetry about a transverse plane PT containing the body central axis B so that the cutting blade is double-ended. The cutting blade has a blade longitudinal axis BA that extends through the body peripheral surface 28 at the two blade ends 102. And here, too, the inner insert receiving pocket 46 is closer to the body central axis B than is the outer insert receiving pocket 58. Also, the inner insert receiving pocket 46 is closer to the transverse plane PT than is the outer insert receiving pocket 58.

Although the subject matter of the present application has been described to a certain degree of particularity, it should be understood that various alterations and modifications could be made without departing from the spirit or scope of the invention as hereinafter claimed.

What is claimed is:

1. A tool body (24) comprising:
   two opposing body side surfaces (26) and a body peripheral surface (28) extending therebetween;
   a body central axis (B) intersecting the two body side surfaces (26);
   a peripherally disposed outer insert receiving pocket (58); and
   an interiorly disposed inner insert receiving pocket (46) comprising a resilient clamping member (36) configured to resiliently retain a chamfering cutting insert (22) therein without the use of an additional, separate clamping device; wherein:
   the peripherally disposed outer insert receiving pocket (58) and the interiorly disposed inner insert receiving pocket (46) are integrally formed together to have unitary, one-piece construction; and
   on both sides of the tool body (24), the inner insert receiving pocket is closer to the body central axis (B) than the peripherally disposed outer insert receiving pocket (58).

2. The tool body (24), according to claim 1, wherein the resilient clamping member (36) is disposed between the inner insert receiving pocket (46) and a resilience slit (42).

3. The tool body (24), according to claim 1, wherein the resilient clamping member (36) is a cantilever having a clamping member fixed end (38) and a clamping member free end (40).

4. The tool body (24), according to claim 1, wherein:
   the inner insert receiving pocket (46) extends along a pocket longitudinal axis (P) which passes through a pocket opening end (48) and a pocket distal end (50), the pocket opening end (48) being located closer to the body peripheral surface (28) than the pocket distal end (50);
   the inner insert receiving pocket (46) transitions into an insert insertion clearance region (56) at the pocket opening end (48); and
   the insert insertion clearance region (56) has a larger dimension, as measured in a direction perpendicular to the pocket longitudinal axis (P), than the inner insert receiving pocket (46).

5. The tool body (24), according to claim 1, wherein:
   the tool body comprises a through recess (30) opening out to the two body side surfaces (26), and at least partially circumferentially bounded by a recess circumferential surface (32);
   the resilient clamping member (36) extends into the through recess (30); and
   the interiorly disposed inner insert receiving pocket (46) is formed by the resilient clamping member (36) and a recess pocket portion (34) of the recess circumferential surface (32).

6. The tool body (24), according to claim 5, wherein the resilient clamping member (36) is connected to the recess circumferential surface (32).

7. The tool body (24), according to claim 5, wherein the through recess (30) is spaced apart from the body peripheral surface (28).

8. The tool body (24), according to claim 5, wherein the through recess (30) opens out to the body peripheral surface (28).

9. The tool body (24), according to claim 5, wherein:
   the two body side surfaces (26) are planar and perpendicular to the body central axis (B).

10. The tool body (24), according to claim 1, wherein:
    the tool body (24) is disc-like and rotatable about the body central axis (B) in a rotational direction (R); and
    the inner insert receiving pocket (46) is closer to the body central axis (B) than is the outer insert receiving pocket (58).

11. The tool body (24), according to claim 1, wherein:
    the tool body (24) is a cutting blade which is mirror symmetric about a transverse plane (PT) containing the body central axis (B); and
    the inner insert receiving pocket (46) is closer to both the transverse plane (PT) and body central axis (B), than is the outer insert receiving pocket (58).

12. The tool body (24), according to claim 1, wherein the peripherally disposed outer insert receiving pocket (58) and the interiorly disposed inner insert receiving pocket (46) are configured to receive cutting inserts which differ from one another in shape.

13. A cutting tool (20) comprising:
    a tool body (24) in accordance with claim 1; and
    a cutting insert (22) resiliently clamped in the inner insert receiving pocket (46) by the resilient clamping member (36).

14. The cutting tool (20) according to claim 13, wherein:
    the resilient clamping member (36) comprises a clamping abutment surface (44);
    the recess pocket portion (34) comprises a pocket abutment surface (52) located opposite the clamping abutment surface (44);
    the cutting insert (22) has an insert peripheral surface (64);
    the insert peripheral surface (64) comprises an insert top surface (70) and an insert bottom surface (72) opposite the insert top surface (70);
    the insert top surface (70) comprises an insert top abutment surface (86);
    the insert bottom surface (72) comprises an insert bottom abutment surface (76);
    the insert bottom abutment surface (76) abuts the pocket abutment surface (52); and
    the clamping abutment surface (44) resiliently engages the insert top abutment surface (86).

15. The cutting tool (20) according to claim 14, wherein the insert top non-abutment surface (88) is spaced apart from the resilient clamping member (36).

16. The cutting tool (20) according to claim 13, wherein the cutting insert is a non-indexable chamfering cutting insert (22), having an insert longitudinal axis (I) defining a forward to rearward direction ($D_F$, $D_R$), the cutting insert (22) comprising:

opposing insert front and rear end surfaces (60, 62) and an insert peripheral surface (64) extending therebetween, the insert peripheral surface (64) comprising an insert top surface (70);

a vertical plane (PV) containing the insert longitudinal axis (I) and passing through the insert top surface (70);

a non-cutting edge (100) formed by the intersection of the insert front end surface (60) and the insert top surface (70); and at least one laterally protruding chamfering portion (90) comprising a chamfering cutting edge (98); wherein:

each chamfering portion (90) is located at a forward end (66) of the cutting insert (22);

in a top view of the insert, the non-cutting edge (100) extends on both sides of the vertical plane (PV) containing the insert longitudinal axis (I); and in said top view of the insert, the insert's total length (TL) taken along the insert longitudinal axis (I) is larger than the insert's total width (TW) taken perpendicular to the vertical plane (PV).

17. The cutting tool (20) according to claim 13, wherein the cutting insert is a non-indexable chamfering cutting insert (22), having an insert longitudinal axis (I) defining a forward to rearward direction ($D_F$, $D_R$), the cutting insert (22) comprising:

opposing insert front and rear end surfaces (60, 62) and an insert peripheral surface (64) extending therebetween, the insert peripheral surface (64) comprising an insert top surface (70);

a non-cutting edge (100) formed by the intersection of the insert front end surface (60) and the insert top surface (70); and at least one laterally protruding chamfering portion (90) comprising a chamfering cutting edge (98); wherein:

in a top view of the insert, the non-cutting edge (100) extends on both sides of a vertical plane (PV) containing the insert longitudinal axis (I) and passing through the insert top surface (70); and the insert top surface (70) comprises an insert top raised portion (80) comprising an insert top abutment surface (86) and an insert top lowered portion (82) comprising an insert top non-abutment surface (88), the insert top lowered portion (82) extending from the insert rear end surface (62) towards the insert top raised portion (80).

18. The cutting tool (20) according to claim 17, wherein the cutting insert (22) comprises exactly two chamfering portions (90) that oppose each other, each chamfering portion (90) having a chamfering cutting edge (98).

19. The cutting tool (20) according to claim 18, wherein the two chamfering cutting edges (98) are spaced apart by the non-cutting edge (100) and extend rearwardly of the non-cutting edge (100).

20. The cutting tool (20) according to claim 18, wherein:
in a top view of the insert, the insert's total length (TL) taken along the insert longitudinal axis (I) is larger than the insert's total width (TW) taken perpendicular to the vertical plane (PV).

21. The cutting tool (20) according to claim 17, wherein the insert top raised portion (80) extends from the insert front end surface (60).

22. The cutting tool (20) according to claim 17, wherein the insert top raised portion (80) and the insert top lowered portion (82) are connected by an insert top intermediate surface (84) that is oriented transversely to the insert top raised and lowered portions (80, 82).

23. The cutting tool (20) according to claim 22, wherein the insert top abutment surface (86) extends to the insert top intermediate surface (84).

24. The cutting tool (20) according to claim 17, wherein the insert top abutment surface (86) is generally V-shaped in an axially perpendicular cross-section.

25. The cutting tool (20) according to claim 17, wherein each chamfering portion (90) is located at a forward end (66) of the cutting insert (22).

26. The cutting tool (20) according to claim 17, wherein the insert top non-abutment surface (88) is planar.

27. The cutting tool (20) according to claim 17, wherein:
the insert top raised portion (80) has an insert top raised portion length (LR);
the insert top lowered portion (82) has an insert top lowered portion length (LL); and
the insert top raised portion length (LR) is less than the insert top lowered portion length (LL).

* * * * *